(12) United States Patent
Romero et al.

(10) Patent No.: US 10,176,652 B2
(45) Date of Patent: Jan. 8, 2019

(54) COMPUTER-IMPLEMENTED SYSTEMS AND METHODS FOR REAL ESTATE PROPERTY SHOWING

(71) Applicant: Boxlty, LLC, York, PA (US)

(72) Inventors: Alberto Romero, York, PA (US); Michael Watroba, York, PA (US)

( * ) Notice: Subject to any disclaimer, the term of this patent is extended or adjusted under 35 U.S.C. 154(b) by 0 days.

(21) Appl. No.: 15/633,997

(22) Filed: Jun. 27, 2017

(65) Prior Publication Data

US 2017/0372542 A1 Dec. 28, 2017

Related U.S. Application Data

(60) Provisional application No. 62/355,413, filed on Jun. 28, 2016.

(51) Int. Cl.
*G07C 9/00* (2006.01)
*G06K 19/06* (2006.01)
(Continued)

(52) U.S. Cl.
CPC ..... *G07C 9/00087* (2013.01); *G06K 7/10554* (2013.01); *G06K 9/00288* (2013.01);
(Continued)

(58) Field of Classification Search
CPC ............ G07C 9/00087; G07C 9/00103; G07C 9/00571; G06K 19/06028; G06K 7/10554;
(Continued)

(56) References Cited

U.S. PATENT DOCUMENTS

| 9,208,466 | B2 * | 12/2015 | Fisher | .................... G06Q 10/08 |
| 2003/0231102 | A1 * | 12/2003 | Fisher | ................ G07C 9/00103 340/5.73 |
| 2003/0231103 | A1 * | 12/2003 | Fisher | ................ G07C 9/00103 340/5.73 |

* cited by examiner

*Primary Examiner* — Ali Neyzari

(57) ABSTRACT

A computer-implemented method for controlling access of a user to a structure, or objects stored within a compartment of a secure lockbox is provided. In some embodiments, the method may be used to control the access of a user to a structure, or one or more objects, such as a key, located in the compartment of a secure lockbox. In further embodiments the method may include the steps of: receiving identification information describing the user from the secure lockbox or electronically-controllable electronic lock device; receiving identification information of an account holder; verifying the received identification information of the user against the account holder information; providing an unlock code to the secure lockbox or the electronically-controllable electronic lock device if the user identification information matches the account holder information. Also disclosed is an improved secure lockbox having a compartment formed therein, which includes an electronically-actuated latching mechanism coupled to a moveable element, such as a door; a network interface; a sensor for sensing a characteristic related to a user attempting to gain access to the compartment; and a processor, wherein the processor is adapted to cause the network interface to transmit information indicative of a sensed characteristic of a user attempting to gain access to the lockbox compartment and capable of processing an unlock signal.

27 Claims, 10 Drawing Sheets

(51) Int. Cl.
*G06K 7/10* (2006.01)
*G06K 9/00* (2006.01)
*G06Q 50/16* (2012.01)

(52) U.S. Cl.
CPC ... *G06K 19/06028* (2013.01); *G07C 9/00896* (2013.01); *G06Q 50/16* (2013.01); *G07C 9/00563* (2013.01); *G07C 9/00571* (2013.01); *G07C 2009/00936* (2013.01)

(58) Field of Classification Search
CPC .... G06K 9/00288; G06Q 50/16; G06Q 10/08; G06Q 30/0203; H04N 7/186; H04L 12/2816; G08B 19/005
USPC ......................................................... 340/5.73
See application file for complete search history.

COMPUTER-IMPLEMENTED SYSTEMS AND METHODS FOR REAL ESTATE PROPERTY SHOWING

CROSS-REFERENCE TO RELATED APPLICATIONS BACKGROUND

This patent application claims priority to U.S. Patent Application Ser. No. 62/355,413, filed Jun. 28, 2016, entitled "Computer-Implemented System and Methods For Real Estate Property Showing," which is hereby incorporated by reference herein in its entirety.

FIELD OF THE INVENTION

This patent specification relates to the field of providing secure controlling access to objects and property. More specifically, this patent specification relates to systems and methods that are configured to control access to structures, or keys and other objects which may be used to gain to such structures.

BACKGROUND

The real estate agent showing process has been the same for decades. Typically, each property that is for sale is equipped with a lockbox containing a key to the property which may be retrieved with input of some form of code or electronic access into the lockbox. That system has served the real estate world but it is lacking in many aspects such as security.

Additionally, the current system is lacking in that it requires the need to have an agent physically show the property to the consumer which limits the amount of time that the property may be viewed and/or the number of potential buyers that may view the property. The current system also results in increased complexity of the purchase or rental lease transaction for the consumer. We solved the concern of a potential buyer/lessee needing an agent to show them the property and give them the ability to show the property themselves. We designed our system to allow a property owner to sell or rent his/her property on their own, without the assistance of an agent.

Therefore, a need exists for novel computer-implemented system and methods for property showing. A further need exists for novel computer-implemented system and methods for property showing that are configured to prevent theft of objects from the property. Finally, a need exists for novel computer-implemented system and methods which allow a property owner to sell or rent his/her property on their own, without the assistance of an agent from showing all the way to closing.

BRIEF SUMMARY OF THE INVENTION

According to one embodiment consistent with the principles of the invention, a computer-implemented system and method for controlling access of a user having a client device to structures, such as real estate property, or objects stored within a compartment of a secure lockbox is provided. In some embodiments, the method may be used to control the access of a user to a structure, or one or more objects, such as a key which may be within the compartment of a secure lockbox. In further embodiments the method may include the steps of: receiving identification information describing the user from the secure lockbox; receiving identification information of an account holder; verifying the received identification information of the user against the account holder information; providing an unlock code to secure lockbox if the user identification information matches the account holder information; and optionally, providing a corresponding unlock code to the client device of the user.

According to another embodiment consistent with the principles of the invention, an improved secure lockbox having a compartment formed therein, comprises a moveable element, such as a door; an electronically-actuated latching mechanism coupled to the moveable element; a network interface for providing communication with a communications network; a sensor for sensing a characteristic related to a user attempting to gain access to the lockbox compartment; and a processor coupled to the latching mechanism, network interface and sensor, wherein the processor is adapted to cause the network interface to transmit information indicative of a sensed characteristic related to the user attempting to gain access to the lockbox compartment and capable of processing an unlock signal to control the latching mechanism to provide access to the compartment by such user.

According to yet another embodiment consistent with the principles of the invention, another computer-implemented method for showing a property employs a remotely-controllable electronic lock device. In some embodiments, the method may be used to show or otherwise allow access to a real estate property or real estate improvement that the user desires to evaluate, and may include the steps of: receiving information representing identification information or characteristic of a user attempting to gain access to a structure sensed by a sensor associated with a remotely-controllable electronic lock device; processing the sensed information to obtain information indicative of the user; receiving information of an account holder, said information including identification information indicative of the account holder; verifying the processed user information relative to the account holder identification information; and transmitting an unlock code to a lock control system associated with the remotely-controllable electronic lock device if the verification step verifies that the processed user information corresponds to the received account holder identification information.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
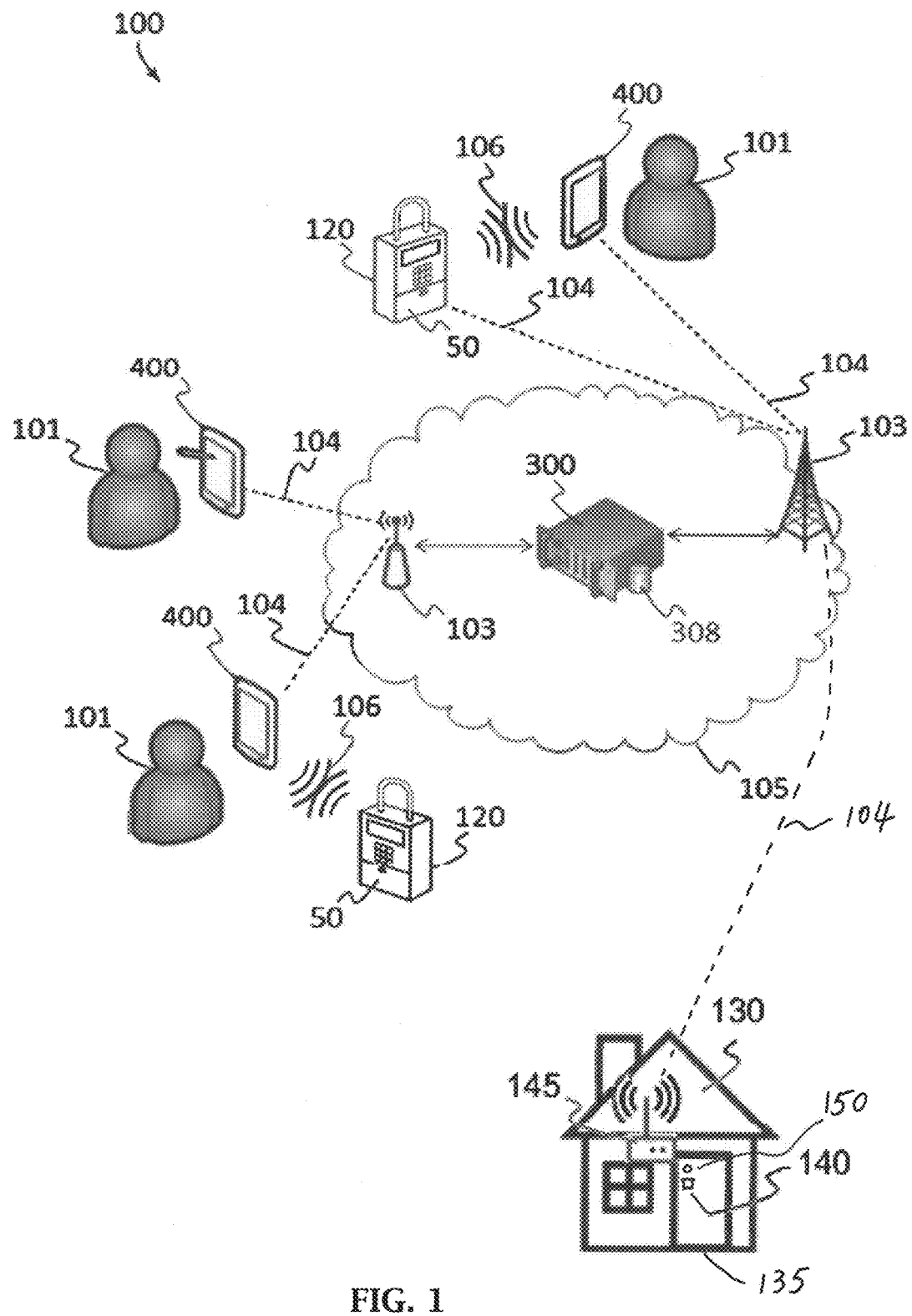
FIG. 1 depicts an illustrative example of some of the components and computer implemented methods which may be found in a system for property showing according to various embodiments described herein.

The terminology used herein is for the purpose of describing particular embodiments only and is not intended to he limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will he further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smart-watches, Fitbit, other wearable fitness trackers, Google Glasses, and the like.

The term "client device" or sometimes "electronic device" or just "device" as used herein is a type of computer or computing device generally operated by a person or user of the system. In some embodiments, a client device is a smartphone or computer configured to receive and transmit data to a server or other electronic device which may be operated locally or in the cloud. Non-limiting examples of client devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smart-watches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the interact or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for showing and controlling access to real estate properties and real estate improvements are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of a system for property showing ("the system") 100 according to various embodiments described herein is presented. The system 100 is configured to facilitate the transfer of data and information between one or more access points 103, secure lockboxes 120, client devices 400, and servers 300 over a data network 105. Each client device 400 and optionally each secure lockbox 120 may send data to and receive data from the data network 105 through a network connection 104 with an access point 103. A data store 308 accessible by the server 300 may contain one or more databases. The data may comprise any information pertinent to one or more users 101 input into the system 100 including information on or describing one or more users 101, information requested by one or more users 101, information supplied by one or more users 101, information describing a property that a secure lockbox 120 is located at, and any other information which a user 101 may he provided such as for the purposes of evaluating a real estate property for a possible real estate transaction.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. Additionally, the system 100 may comprise one or more secure lockboxes 120 which may be configured to control access to keys and other objects which may he used to gain to entrance real estate properties, structures, improvements, and the like. The present invention may be implemented on at least one secure lockbox 120, client device 400, and/or server 300 programmed to perform one or more of the steps described herein. In some embodiments, more than one secure lockbox 120, client device 400, and/or server 300 may be used, with each being programmed to carry out one or more steps of a method or process described herein.

In some embodiments, the system 100 may be configured to facilitate the communication of information between one or more secure lockboxes 120 and users 101, through their respective client devices 400, and servers 300 of the system 100. Electronic communication 106 between a client device 400 and a secure lockbox 120 may comprise wireless and/or wired communication. Users of the system 100 may include one or more owners of real estate property, sellers of real estate property, real estate agents, showers or real estate property, buyers of real estate property, renters real estate property, and/or any other individual that may require or grant access to a real estate property. In some embodiments, a secure lockbox 120 may be stationed at a real estate property may include a lockbox housing having a compartment 50 formed therein, and a moveable element, such as door, coupled to the housing to provide or prevent access to the compartment.

In some embodiments, a secure lockbox 120 may be configured to contain and control access to a key in the compartment 50, which may be used to access the real estate property and/or an improvement on the real estate property. Using their client device 400 and a secure lockbox 120, a user 101 may send and receive information with the system 100 that may be used to gain access to the key which may be contained or otherwise accessed from the secure lockbox 120. Once the key has been retrieved from the secure lockbox 120, the user may access the property or improvement. Optionally, the secure lockbox 120 may record and provide to the system 100 information describing events or actions of the user 101 while the user 101 is accessing the property or improvement and/or after the user 101 has accessed the property or improvement.

FIG. 1 further depicts a structure 130, such as house, apartment, condominium, office, building, or other real estate property, having an exemplary access door 135 with a remotely-controllable electronic lock device 140, which may include a network interface 145 for communicating with the server 300 over the data network 105 via an associated network connection 104. At least one sensor 150 is disposed proximate the access door 135 and may be part of, or associated with, the remotely-controllable electronic lock device 140. The sensor 150 may be an image capture device, such as a camera, that encodes characteristic information, such as images and videos, for providing to the server 300, and/or for storing such information for later reproduction. Suitable cameras useable for the sensor 150 include those cameras described with regard to camera 31 in FIG. 6.

In addition, the sensor 150 may be configured to detect or sense information indicative of the user 101 including, a fingerprint scanner, or biotelemetry sensor, or other detector including, for example, code detectors for reading, for example, bar codes, quick response (QR) codes, or other identification codes. Other suitable detectors useable for the sensor 150 include detectors for detecting if a NFC tag, card, key fob, or the like is in proximity to the remotely-controllable electronic lock device 140. Optionally, one or more sensors 150 may be integrally formed with the remotely-controllable electronic lock device 140 or in remote wired or wireless communication with the remotely-controllable electronic lock device 140.

The remotely-controllable electronic lock device 140 may enable the access door 135 of the structure 130 to be locked and unlocked by, for example, electronic, magnetic or electro-magnetic means. As used herein, the remotely-controllable electronic door lock device refers to any remotely-controlled device or system that enables or inhibits access via an associated door to a structure or secure area including, for example, electro-mechanical and electro-magnetic systems for garage doors, hinged doors, roll-top, sliding doors and rotating doors.

A lock control system (not shown) may be associated, for example, with an electronic lock manufacturer or a central control system for remotely-controllable electronic lock devices, such as the remotely-controllable electronic lock device 140 including, for example, automated remotely-operable garage door openers. Suitable lock control systems useable for the remotely-controllable electronic lock device 140 include, but are not limited to, cloud servers that control door lock devices such as, for example, Google Cloud IoT, AWS IoT, GE Predix, Microsoft Azure IoT, IBM Watson IoT, Samsung SmartThings, Wink, and Insteon. As used herein, a "cloud server" is a computer server that is built, hosted and delivered through a cloud computing platform over the Internet. Cloud servers possess and exhibit similar capabilities and functionality to a typical server but are accessed remotely. Servers connected to network hubs, such as Amazon Alexa-enabled devices, Google Home-enabled devices and Samsung Smartthing hub, may also be used for the remotely-controllable electronic lock device 140. The lock control system may be disposed or located remotely or proximate the remotely-controllable electronic lock device 140.

It should be readily understood that the lock control system may alternative communicate with the remotely-controllable electronic lock device 140 that enables the locking or unlocking of the access door 135 depending upon the type of electronic lock employed with the access door 135. Further, the access door 135 is meant to include any lockable door of a structure including, for example, an entry door, garage door and may be in the form of, for example, a hinged door, roll-top door, sliding door or rotating door.

Figure 2:
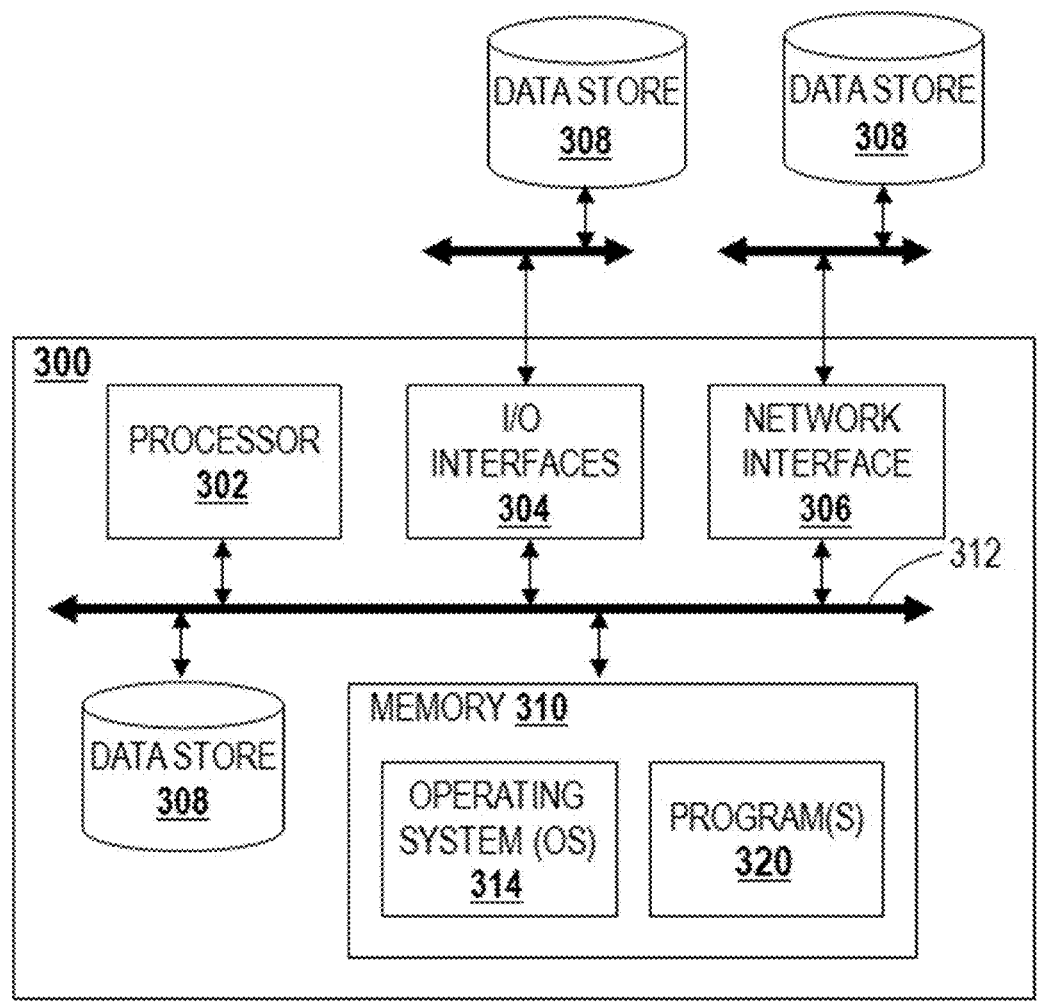
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RE) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e,g., 10BaseT, Fast Ethernet, Gigabit Ethernet, 10GbE) or a wireless local area network (WEAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
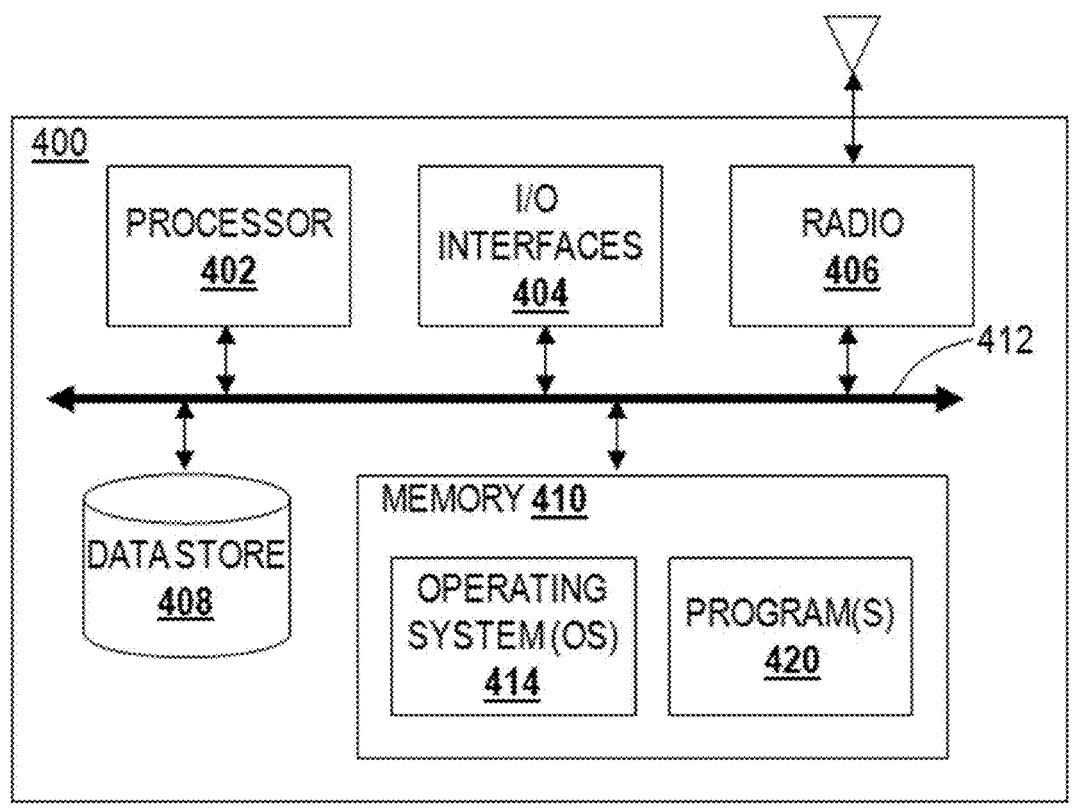
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
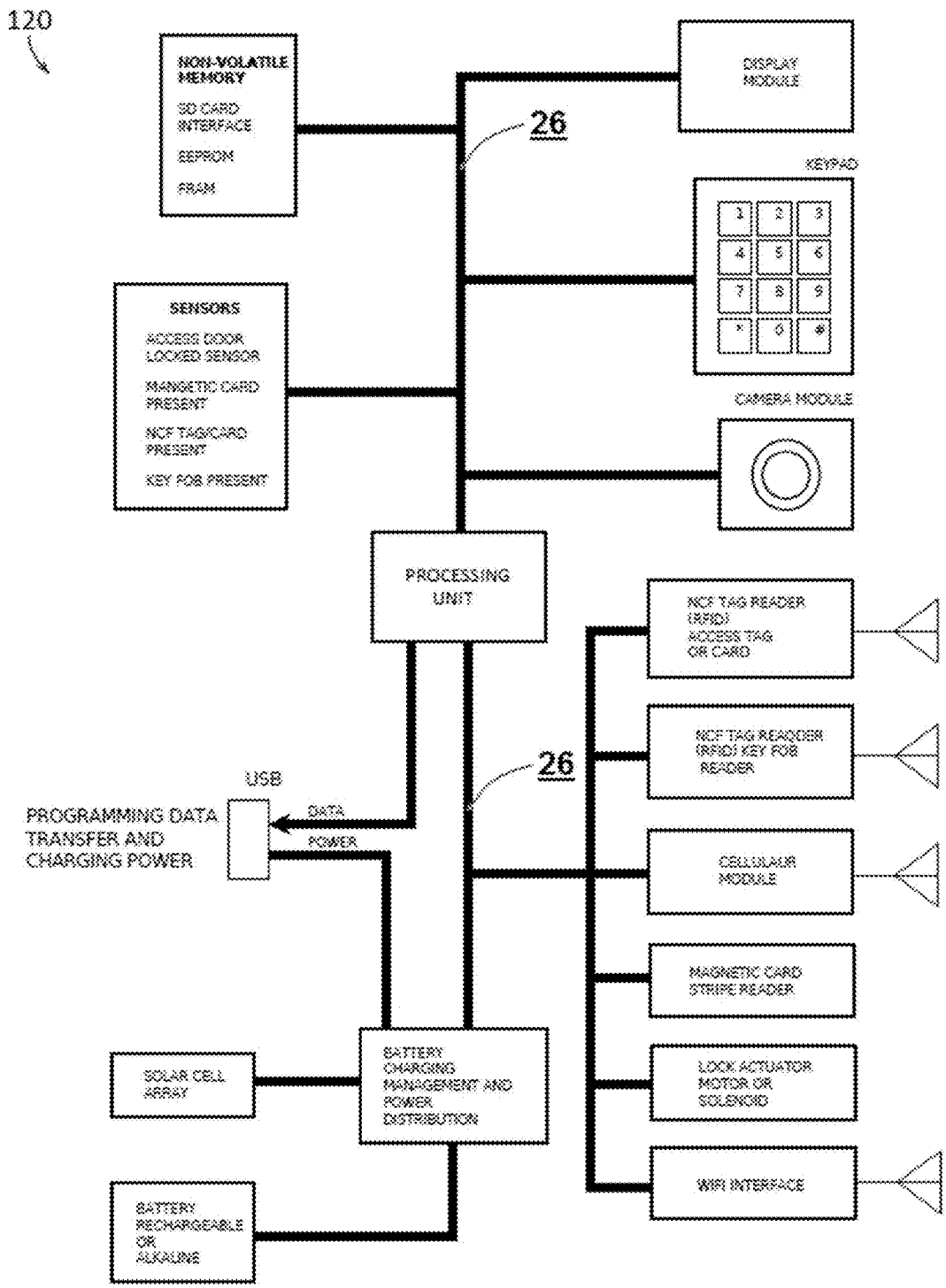
FIG. 4 depicts a block diagram showing an example of some of the components of a secure lockbox which may be used by the system as described in various embodiments herein.
Figure 5:
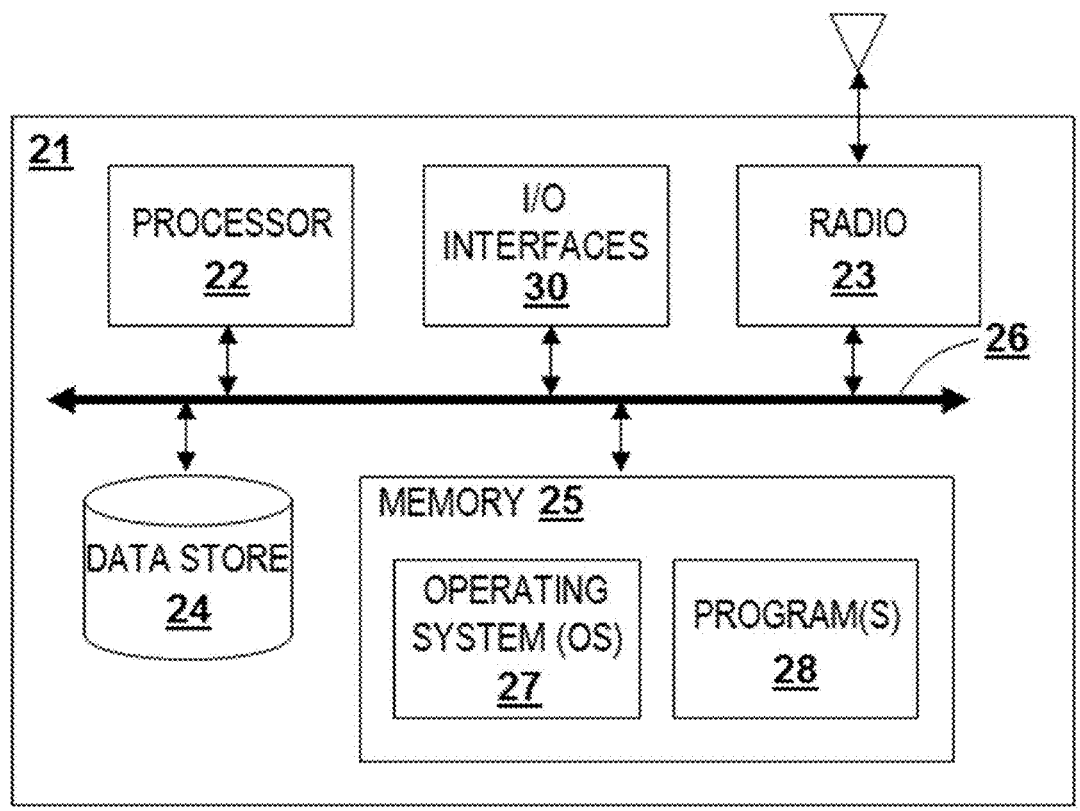
FIG. 5 illustrates a block diagram showing an example of a processing unit of a secure lockbox which may be used by the system as described in various embodiments herein.
Figure 6:
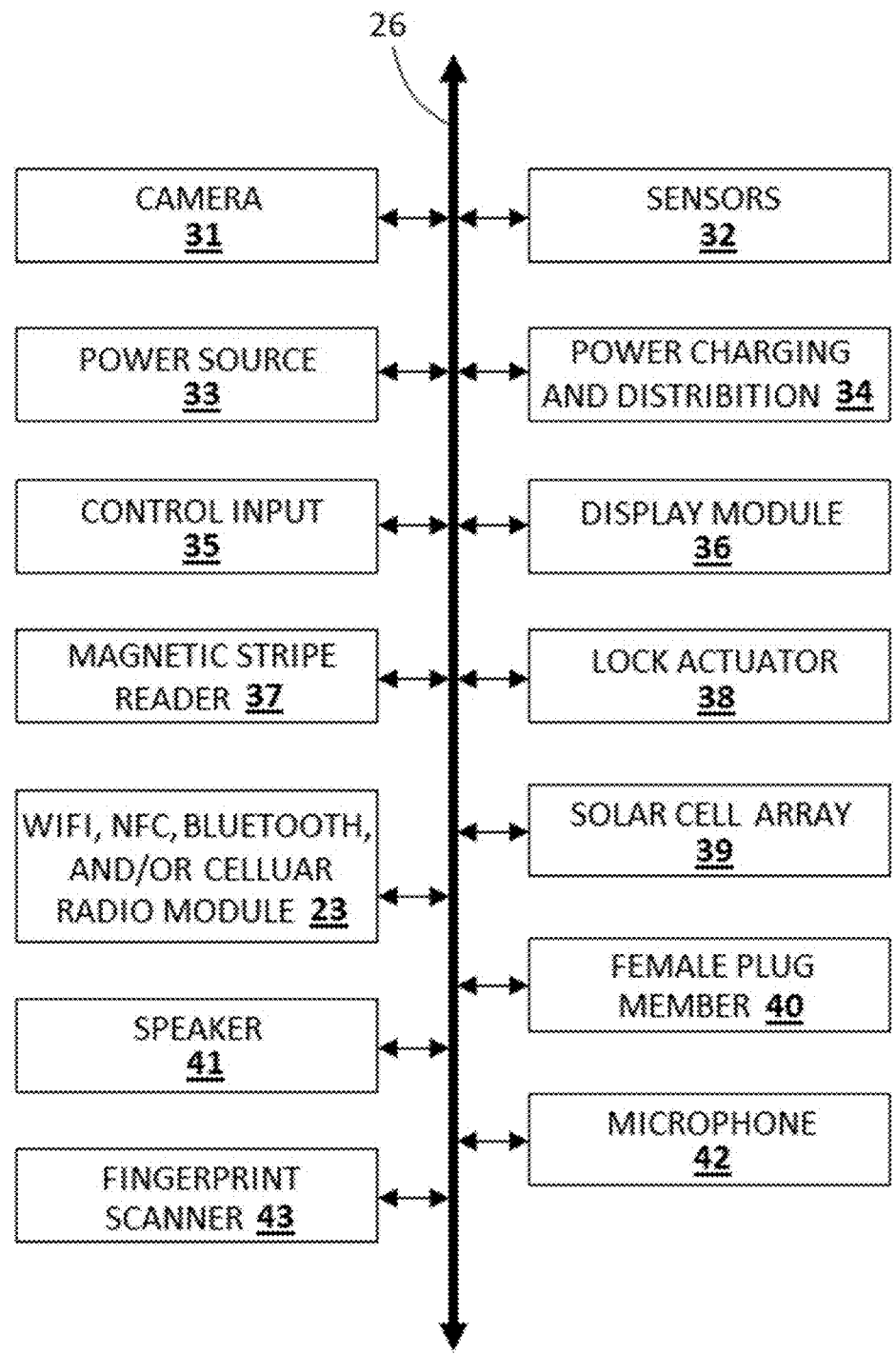
FIG. 6 shows a block diagram showing an example of some of the input/output interfaces of a secure lockbox which may be used by the system as described in various embodiments herein.

Referring now to FIGS. 4-6, diagrams showing some of the components of an exemplary secure lockbox 120 which may be used by the system 100 as described in various embodiments herein are depicted. In some embodiments and in the present example, a secure lockbox 120 can be a digital device that, in terms of hardware architecture, comprises a processing unit 21 which generally includes a processor 22, one or more input/output (I/O) interfaces 30, an optional radio 23, a data store 24, and memory 25. It should be appreciated by those of ordinary skill in the art that FIG. 4 depicts an example of a secure lockbox 120 in an oversimplified manner, and a practical embodiment may include additional components or elements and suitably configured processing logic to support known or conventional operating features that are not described in detail herein. The components and elements (22, 30, 23, 24, and 25) are communicatively coupled via a local interface 26. The local interface 26 can be, for example but not limited to, one or more circuit boards, buses, or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

The processor 22 is a hardware device for executing software instructions. The processor 22 can be any custom made or commercially available processor, a central processing unit (CPU), an auxiliary processor among several processors associated with the processing unit 21, a semiconductor-based microprocessor (in the form of a microchip or chip set), or generally any device for executing software instructions. When the processing unit 21 is in operation the processor 22 is configured to execute software stored within the memory 25, to communicate data to and from the memory 25, and to generally control operations of the secure lockbox 120 pursuant to the software instructions. In an exemplary embodiment, the processor 22 may include a mobile optimized processor such as optimized for power consumption and mobile applications. The I/O interfaces 30 can be used to output information to a user 101 and to receive user input. Additionally, an I/O interface 30 may comprise a servo, actuator, or other access controlling device which may be used to open and close a compartment in the secure lockbox 120 which may be used to contain small objects such as keys to real estate properties and improvements. The I/O interfaces 30 can also include, for example, a serial port, a parallel port, a small computer system interface (SCSI), an infrared (IR) interface, a radio frequency (RF) interface, a universal serial bus (USB) interface, and the like.

One or more radios 23 may enable wireless communication to an external access device, such as a client device 400, or network 105. In some embodiments, a radio 23 may operate on a cellular band and may communicate with or receive a Subscriber identity Module (SIM) card or other wireless network identifier. Any number of suitable wireless data communication protocols, techniques, or methodologies can be supported by one or more radios 23, including, without limitation; RF; IrDA (infrared); Bluetooth; ZigBee (and other variants of the IEEE 802.15 protocol); IEEE 802.11 (Wifi or any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. In further embodiments and as shown in FIG. 4, optionally a secure lockbox 120 may comprise a NFC radio 23, a cellular radio 23 module, a Wifi radio 23, and/or a Bluetooth radio 23. In alternative embodiments, a secure lockbox 120 may comprise one or more radios 23 with NFC, cellular, Wifi, and/or Bluetooth communication capabilities as depicted in FIG. 6.

The data store 24 may be used to store data. The data store 24 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by the processor 22. The software in memory 25 can include one or more software programs, each of which includes an ordered listing of executable instructions for implementing logical functions. In the example of FIG. 4, the software in the memory system 25 includes a suitable operating system (O/S) 27 and programs 28. The operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 28 may include various applications, add-ons, etc. configured to provide end user functionality with the apparatus 100. For example, exemplary programs 28 may include, but not limited to, a communication application 121, a verification application 122, and/or a sensor application 123.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 21 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 22. In addition, the main memory may be used for storing temporary variables or other intermediate information during the execution of instructions by the processor 22. The processing unit 21 may further include a read only memory (ROM) or other static storage device (e.g., programmable ROM (PROM), erasable PROM (EPROM), and electrically erasable PROM (EEPROM)) coupled to the bus for storing static information and instructions for the processor 22.

In some embodiments, a secure lockbox 120 may comprise one or more cameras 31 which may be configured to provide to the server 300, or record, still or video images of the environment around the secure lockbox 120 and preferably of a user 101 that is interacting with the secure lockbox 120. In preferred embodiments, a camera 31 may comprise a digital camera that encodes images and videos digitally on a charge-coupled device (CCD) image sensor or on a complementary metal-oxide-semiconductor (CMOS) image sensor for providing to the server 300, and/or for storing images for later reproduction. In other embodiments, a camera 31 may comprise any type of camera which includes an optical system., typically using a lens with a variable diaphragm to focus light onto an image pickup device or image sensor.

In some embodiments, a secure lockbox 120 may comprise one or more sensors 32 which may be configured to provide and record information describing the secure lockbox 120 and/or describing the real estate property or improvement that a lockbox is stationed at. In further embodiments, a sensor 32 may comprise a door lock sensor which may be configured to provide information to the secure lockbox 120 describing if a door is locked or unlocked and/or open or closed. In further embodiments, a sensor 32 may comprise a sensor configured to provide information to the secure lockbox 120 describing if a magnetic card has been inserted or is present in a magnetic stripe reader 37. In further embodiments, a sensor 32 may comprise a sensor configured to detect information indicative of the user 101 including, a fingerprint scanner, or biotelemetry sensor, or other detector including, for example, code detectors for reading, for example, bar codes or quick response codes. Other suitable detectors useable for the sensor 32 include detectors for detecting if a NFC tag, card, key fob, or the like is in proximity to the secure lockbox 120. Optionally, one or more sensors 32 may be integrally formed with the secure lockbox 120 or in remote wired or wireless communication with the secure lockbox 120. In yet further embodiments, the sensor 32 may comprise a sensor or sensors configured to determine the presence or absence of contents within the compartment 50. Such sensors may include, for example, electrical, optical, magnetic or electro-mechanical sensors.

In some embodiments, a secure lockbox 120 may comprise a power source 33 which may provide electrical power to any component of a secure lockbox 120 that may require electrical power. A power source 33 may comprise a battery, such as a lithium ion battery, nickel cadmium battery, alkaline battery, or any other suitable type of battery, a fuel cell, a capacitor, or any other type of energy storing and/or electricity releasing device. In further embodiments, a power source 33 may comprise a power cord, kinetic or piezo electric battery charging device, a solar cell or photovoltaic cell, and/or inductive charging or wireless power receiver. In further embodiments, a secure lockbox 120 may comprise a power charging and distribution 34 module which may be configured to control the recharging of the power source 33, discharging of the power source 33, and/or distribution of power to one or more components of a secure lockbox 120 that may require electrical power.

In some embodiments, a secure lockbox 120 may comprise one or more control inputs 35 which may be configured to accept user 101 input to allow a user 101 to interact with the secure lockbox 120. In further embodiments, a control input 35 may comprise a key pad, such as a twelve key keypad, or the like. In still further embodiments, a control input 35 may comprise or include turnable control knobs, depressable button type switches, slide type switches, rocker type switches, or any other suitable input that a user 101 may physically interact with to control a function of the secure lockbox 120.

In some embodiments, a secure lockbox 120 may comprise one or more display modules 36 which may be configured to output and display visual information to a user 101. In further embodiments, a display module 36 may comprise a Liquid crystal display (LCD), Light-emitting diode display (LED), Electroluminescent display (ELD), Electronic paper, E Ink Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, and/or Interferometric modulator display (IMOD).

In some embodiments, a secure lockbox 120 may comprise a magnetic stripe reader 37, also called a magstripe reader, which may be a hardware device that reads information encoded in a magnetic stripe located on card, badge, or the like. In further embodiments, a magnetic stripe reader 37 may be an insertion-type reader which requires that the badge or card be inserted into the reader and then pulled out. In still further embodiments, a magnetic stripe reader 37 may be swipe-type reader which requires that the badge or card pass completely through the reader. In other embodiments, a magnetic stripe reader 37 may be any other type or style of reader which may be able to record or receive magnetically encoded information from an object such as a card, badge, or the like.

In some embodiments, a secure lockbox 120 may be stationed at a real estate property and the secure lockbox 120 may be configured to contain and control access to a key which may be used to access the real estate property and/or an improvement on the real estate property. In preferred embodiments, a secure lockbox 120 may comprise one or more compartments 50 (FIG. 1), such as a cavity, receptacle, or the like, which may be configured to receive a key or other small objects. The compartment 50 may comprise a door or other access controlling portal and also comprise a lock actuator 38 which may be configured to control the opening and/or closing of the access controlling portal of the compartment 50. In some embodiments, a lock actuator 38 may comprise an actuator which may be operated by a source of energy, typically electric current, hydraulic fluid pressure, or pneumatic pressure, and which converts that energy into motion for the purposes of locking and unlocking the door or other access controlling portal of a compartment 50. Examples of lock actuators 38 may include comb drives, digital micromirror devices, solenoids, electric motors, electroactive polymers, hydraulic cylinders, piezoelectric actuators, pneumatic actuators, servomechanisms, thermal bimorphs, screw jacks, or any other type of hydraulic, pneumatic, electric, mechanical, thermal, and magnetic type of actuator, to cause an unlock of a latching mechanism for the access door to the compartment 50, or to move such door from a closed and locked position to an open position, and vice-a-versa. In a further embodiment, the moveable element or door may be a backplate, i.e., attachable to a structure and access to the compartment 50 would he enabled by movement of the secure lockbox housing relative to the door attached to a structure.

In some embodiments, a secure lockbox 120 may comprise a female plug member 40 which may be configured to receive and electrically communicate with a male plug member. The female plug member 40 may allow data to be wiredly imported and exported from the data store 24 (FIG. 5) of the secure lockbox 120. Optionally, a female plug member 40 may be configured to receive power and to communicate the power to a power source 33, power charging and distribution 34 module, and/or to any other electrical component of a secure lockbox 120. In preferred embodiments, a female plug member 40 may comprise a female USB connector such as a female micro-USB connector or female mini-USB connector. In other embodiments, an female plug member 40 may comprise a female Type A USB connector, a female Type B USB connector, a female Mini-A USB connector, a female Mini-B USB connector, a female Micro-A USB connector, a female Micro-B USB connector, a female Micro-B USB 3.0 connector, a female ExtMicro USB connector, a female Lightning connector, a female 30-pin dock connector, a female Pop-Port connector, a female Thunderbolt connector, a female Firewire connector, a female Portable Digital Media Interface (PDMI) connector, a female coaxial power connector, a female barrel connector, a female concentric barrel connector, a female tip connector, or any other plug, connector, or receptacle capable of electrical communication with an electronic device.

In some embodiments, a secure lockbox 120 may comprise one or more speakers 41 which may be used to produce a plurality of sounds at a plurality of volume levels. In further embodiments, a speaker 41 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

In some embodiments, a secure lockbox 120 may comprise one or more microphones 41 which may be configured to pick up or record audio information from the environment around the secure lockbox 120. In preferred embodiments, a microphone 41 may comprise any acoustic-to-electric transducer or sensor that converts sound in air into an electrical signal. In further embodiments, a microphone 41 may comprise any type of microphone such as electromagnetic induction microphones (dynamic microphones), capacitance change microphones (condenser microphones), and piezo-electricity microphones (piezoelectric microphones) to produce an electrical signal from air pressure variations.

In some embodiments, a secure lockbox 120 may comprise one or more fingerprint scanners 43. A fingerprint scanner 43 is an electronic device used to capture a digital image of the fingerprint pattern or other characteristic. The captured image may be referred to as a live scan. This live scan may be digitally processed to create a biometric template (a collection of extracted features) which is stored and used for matching. In further embodiments, a fingerprint scanner 43 may operate with technologies including optical, capacitive, radio frequency (RF), thermal, piezoresistive, ultrasonic, piezoelectric, microelectromechanical systems (MEMS), or any other suitable fingerprint reading technology.

Figure 7:
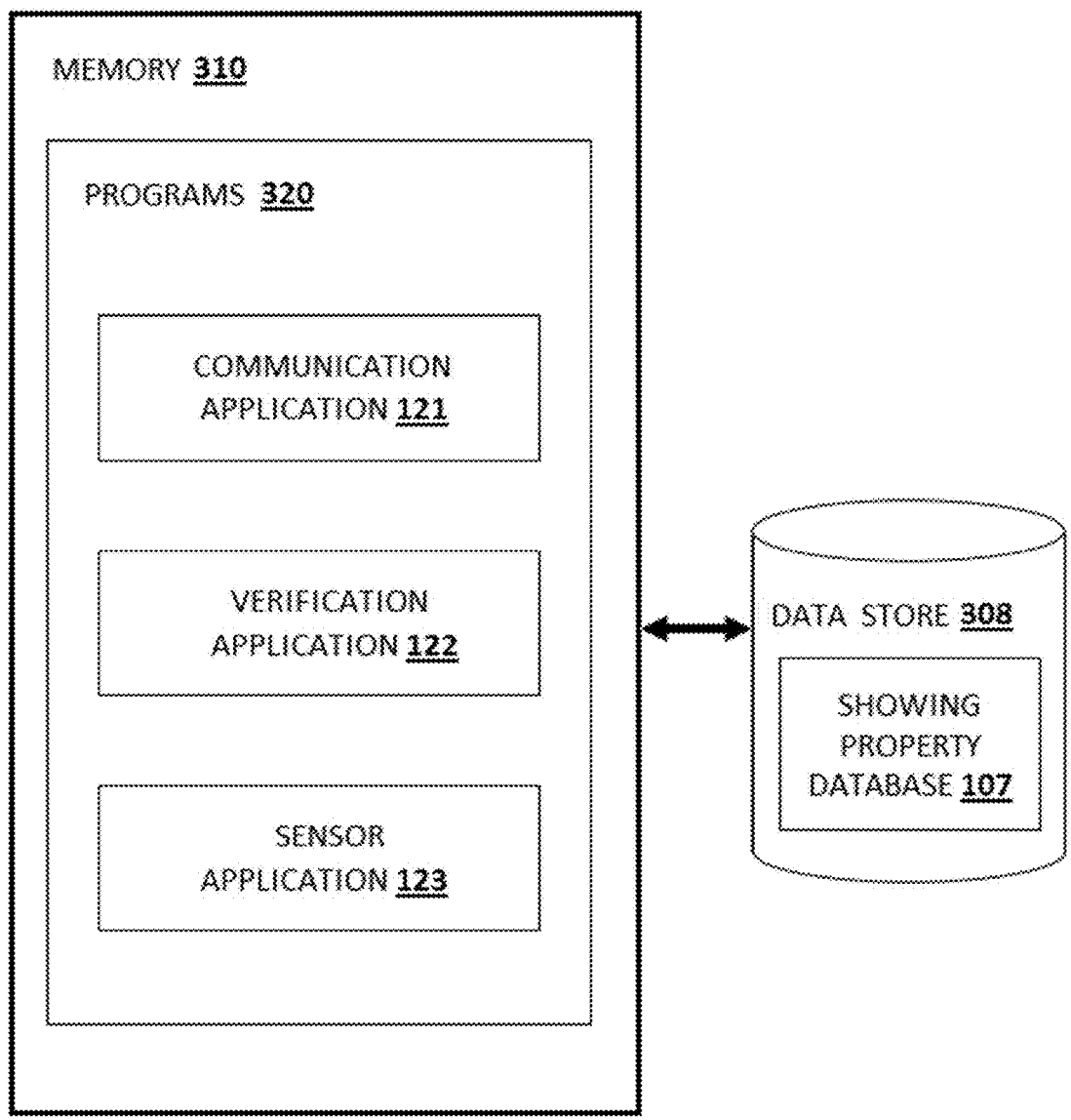
FIG. 7 depicts a block diagram illustrating data storage and some applications of a computer implemented system for property showing which may function as software rules engines according to various embodiments described herein.

FIG. 7. depicts a block diagram illustrating some applications or software rules engines which may be found in a system 100 (FIG. 1) and which may optionally be configured to run on a server 300 (FIGS. 1 and 2) and an example of a property showing database 107 according to various embodiments described herein. In some embodiments, one or more servers 300 may be configured to run one or more software rules engines or programs such as a communication application 121, verification application 122, and/or sensor application 123. In this embodiment, the engines 121, 122, 123, are configured to run on at least one server 300. The server 300 may be in electronic communication with a data store 308 comprising a database, such as a property showing database 107. The engines 121, 122, 123, may read, write, or otherwise access data in one or more databases of the data store 308. Additionally, data may be sent and received to and from one or more client devices 400 (FIGS. 1 and 3) and secure lockboxes 120 (FIGS. 1, 4, 5 and 6) which may be in wired and/or wireless electronic communication with a server 300 through network 105. In other embodiments, a communication application 121, a verification application 122, and/or a sensor application 123 may be configured to run on a secure lockbox 120, a client device 400, and/or a server 300 with data transferred to and from one or more servers 300 in communication with a data store 308 through a network 105. In still further embodiments, secure lockbox 120, a server 300, or a client device 400 may be configured to run a communication application 121, a verification application 122, and/or a sensor application 123.

In some embodiments, the system 100 may comprise a database, such as a property showing database 107, optionally stored on a data store 308 accessible to a communication application 121, a verification application 122, and/or a sensor application 123. In further embodiments, a completion database 110 may be stored on a data store 408 of a client device 400. A property showing database 107 may comprise any data and information pertinent to one or more users 101 input into the system 100. This data may include user information which may comprise information on or describing one or more users 101. For example, stored user information may include user 101 information such as address or contact information, a photograph or picture of the user 101, fingerprint or other biotelemetry information, financial and financial account information, information on one or more real estate properties or improvements to real estate properties that the user 101 owns, rents, is selling, is showing, or is otherwise associated with, licensing or other government regulation compliance information, and/or any other information which may describe a user 101 or be pertinent to the showing of a real estate property or improvement.

The communication application 121 may comprise a computer program which may be executed by a computing device processor, such as a processor 22 (FIGS. 3-5), a processor 302 (FIG. 2), and/or a processor 402 (FIG. 3), and which may be configured to govern electronic communication between secure lockboxes 120, severs 300, and client devices 400. Data from secure lockboxes 120, severs 300, and client devices 400 may be received by the communication application 121 which may then electronically communicate the data to the verification application 122 and sensor application 123. Likewise, data from the verification application 122 and sensor application 123 may be received by the communication application 121 which may then electronically communicate the data to secure lockboxes 120, severs 300, and client devices 400. In some embodiments, the communication application 121 may govern the electronic communication by initiating, maintaining, reestablishing, and terminating electronic communication between one or more secure lockboxes 120, severs 300, and client devices 400. In further embodiments, the communication application 121 may control the network interface 306 of a server 300, radio 23 of a secure lockbox 120, and/or radio 406 of a client device 400 to send and receive data to and from one or more client secure lockboxes 120, severs 300, and client devices 400 through a network connection 104 (FIG. 1) over a network 105 (FIG. 1). Additionally, the communication application 121 may be configured to store, retrieve, modify, delete, create, or otherwise interact with data in a property showing database 107.

The verification application 122 may comprise a computer program which may be executed by a computing device processor, such as a processor 22 (FIGS. 3, 4 and 5), a processor 302 (FIG. 2), and/or a processor 402 (FIG. 3), and which may be configured to compare data received from the communication application 121 to data received from the association application 122. In some embodiments, the verification application 122 may compare the client input received through the client device 400 of the user 101, such as a photograph of the user taken by a camera I/O interface 404 of a client device 400 and/or a photograph of the user taken by a camera 31 of a secure lockbox 120, to data retrieved by the communication application 121 from the property showing database 107. In further embodiments, the verification application 122 may compare the client input received through a secure lockbox 120, such as from a camera 31, sensor 32, control input 35, or magnetic stripe reader 37, from the user 101 to data retrieved by the communication application 121 from the property showing database 107. The verification application 123 may be configured to determine if data provided by the secure lockbox 120 and/or client device 400 of a user 101 matches data, preferably data associated with the user 101 and/or with the property or improvement that the secure lockbox is stationed at, retrieved from the property showing database 107.

The sensor application 123 may comprise a computer program which may be executed by a computing device processor, such as a processor 22 (FIGS. 3-5), a processor 302 (FIG. 2), and/or a processor 402 (FIG. 3), and which may be configured to provide data from one or more sensors 32, such as a door lock sensor, a magnetic card detection sensor, or a NFC tag, card, key fob, sensor to the communication application 121 and/or verification application 122. Additionally, the sensor application 123 may be configured to provide data from a camera 31, control input 35, magnetic stripe reader 37, and female plug member 40 to the communication application 121 and/or verification application 122. In further embodiments, the sensor application 123 may be configured control data and power to a display module 36 and lock actuator 38 using data provided by the communication application 121 and/or verification application 122.

Figure 8:
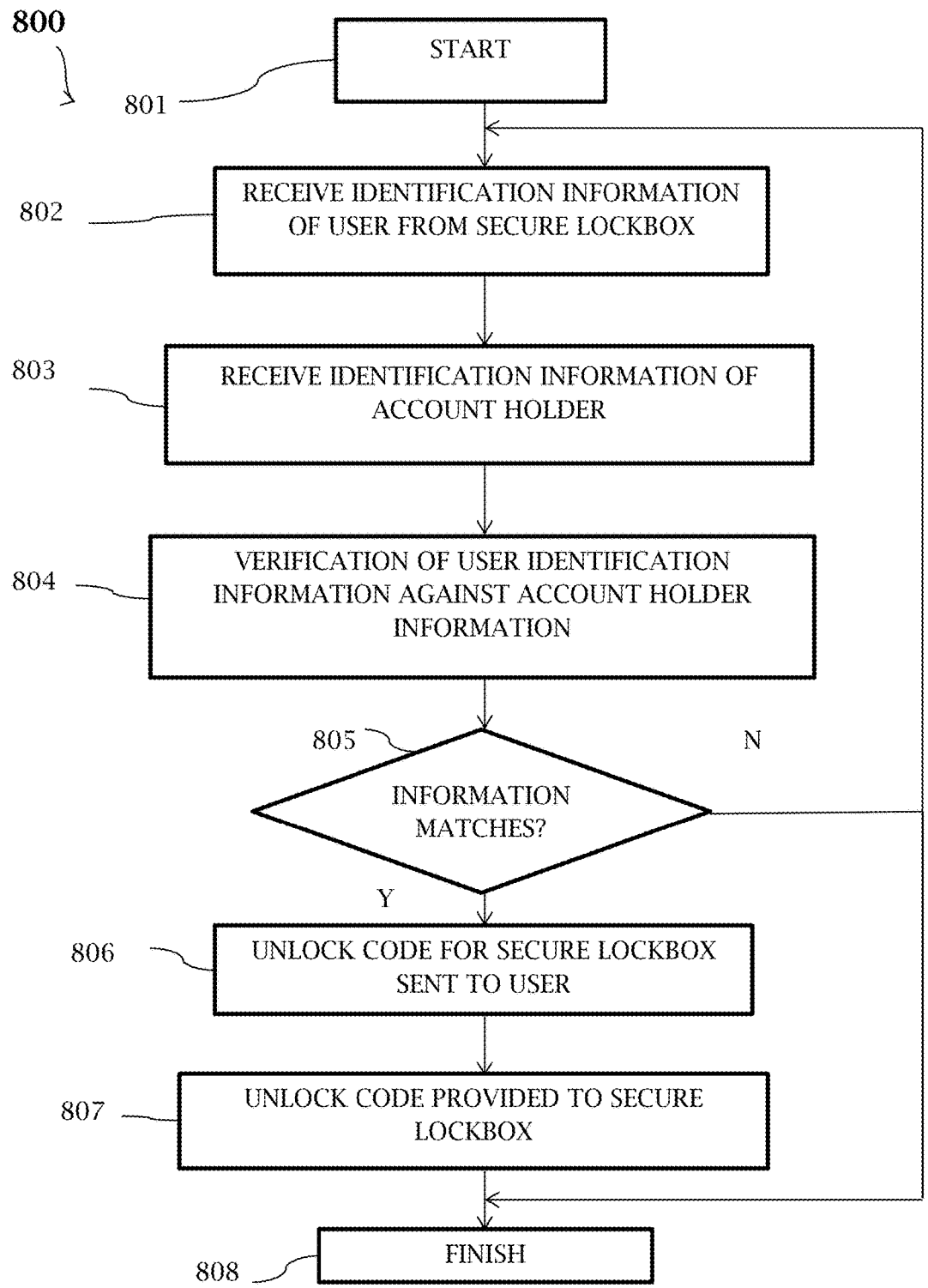
FIG. 8 illustrates a block diagram of an example of a computer-implemented method for controlling access to objects stored within a secure lockbox according to various embodiments described herein.

FIG. 8 illustrates a block diagram of an example of a computer-implemented method for controlling access to objects stored within a secure lockbox ("the method") 800 according to various embodiments described herein. In some embodiments, the method 800 may he used to control the access of a user 101 to one or more objects, such as a key, which may be within the compartment 50 (FIG. 1) of a secure lockbox 120 (FIGS. 1, 4). For example, the method may be utilized to allow a user 101 to access a key to a real estate property that the user 101 desires to evaluate. The key may be stored in the compartment 50 of a secure lockbox 120 at the property and upon completion of the method 800, the user 101 may access the key in the secure lockbox 120. One or more steps of the method 800 may be performed by a communication application 121, a verification application 122, and/or a sensor application 123 which may be executed by a computing device processor, such as a processor 22 (FIGS. 3, 4 and 5), a processor 302 (FIG. 2), and/or a processor 402 (FIG. 3).

In some embodiments, the method 800 may start 801 based on the server 300 including accounts for one or more account holders. The accounts may be stored in a property showing database 107 by a communication application 121 and may comprise information on or describing one or more users or account holders 101. For example, such information may include account holder information such as address or contact information, a photograph or picture of the account holder, fingerprint or other biotelemetry information, financial and financial account information, information on one or more real estate properties or improvements to real estate properties that the account holder owns, rents, is selling, is showing, or is otherwise associated with, licensing or other government regulation compliance information, and/or any other information which may describe a account holder or be pertinent to the showing of a real estate property or improvement.

In step 802, identification information indicative of the user 101 may be received from the secure lockbox 120 by a sensor application 123 and/or communication application 121. In some embodiments, a user 101 may provide identification information to the secure lockbox 120 by allowing, for example, the camera 31 of the secure lockbox 120 to capture a characteristic of the user 101, such as an image of the face of the user 101, or a fingerprint sensor to obtain fingerprint information of the user 101.

In step 803, identification information may be retrieved of an account holder based on either the identification information received from the lockbox in step 802, or some other information identifying which particular account holder the user 101 purports to be, or from which group of account holders the user 101 purports to belong.

In other embodiments, a user 101 may provide identification information to the secure lockbox 120 by providing input through a control input 35, such as a keypad. In still other embodiments, a user 101 may provide identification information to the secure lockbox 120 in the form of a bar or QR code or other identification code, or by swiping a card, badge, credit card, identification card, or the like, having a magnetic information stripe through a magnetic stripe reader 37. In still further embodiments, a user 101 may provide identification information to the secure lockbox 120 by providing wiredly communicated data through a female plug member 40 and/or wirelessly communicated through a radio 23, such as with Wifi, Bluetooth, NFC, and cellular communication protocols using their client device 400, NFC keyfob, NFC tag, or the like.

Next in step 804, the provided identification information from the secure lockbox 120 may be verified against the account information of the user 101 by the verification application 122. In some embodiments, the verification application 122 may compare the picture from the secure lockbox 120 to a picture of the user 101 stored in the property showing database 107 using facial recognition software or technology. In other embodiments, the verification application 122 may compare fingerprint information or the identification information provided through a control input 35, such as a keypad, to identification information of the user 101 stored in the property showing database 107.

In still other embodiments, the verification application 122 may compare the identification information provided through a magnetic stripe reader 37 to identification information of the user 101 stored in the property showing database 107. In still further embodiments, the verification application 122 may compare the identification information wiredly-communicated data through a female plug member 40 and/or wirelessly communicated through a radio 23, such as with Wifi, Bluetooth, NFC, and cellular communication protocols using their client device 400, NFC keyfob, NFC tag, or the like, to identification information of the user 101 stored in the property showing database 107.

Next, the method 800, may proceed to decision block 805. If the provided identification information from the secure lockbox 120 does not match the account information of the user 101. The method 800 may optionally continue to step 802 or the method 800 may optionally finish 808. If the verification application 122 matches or verifies the provided identification information from the secure lockbox 120 to the account information of the user 101, the method 800 may proceed to step 806 and an unlock code for the secure lockbox 120 may be sent to the user 101 by the communication application 121. In some embodiments, an unlock code for the secure lockbox 120 may be sent to the user 101 by being sent to the client device 400 of the user 101.

Then, in step 807, the unlock code may be provided to the secure lockbox 120. In some embodiments, the unlock code may be provided to the secure lockbox 120 through the data network 105, or by displaying or otherwise outputting the unlock code on through the client device 400 of the user 101 and the user may enter the code into the secure lockbox 120, such as through a control input 35, female plug member 40, or microphone 42. In other embodiments, the unlock code may be provided to the secure lockbox 120 by communicating the code from the client device 400 of the user 101 to the secure lockbox 120 by way of a sensor 32 or Wifi, Bluetooth, NFC, or other wireless communication from the client device 400 to the secure lockbox 120.

Once the unlock code is provided to the user 101 and secure lockbox 120 in steps 806 and 807, the user 101 (or her/his user device 400) may communicate her/his unlock code to the secure lockbox 120, and assuming, the unlock codes match or correlate with one another, the secure lockbox 120 will enable the user 101 to gain access to the contents of the compartment 50. Upon completion of steps 806 and 807, the method 800 may finish 808.

Although performance of the steps 806 and 807 provide an increased measure of protection against potential users attempts to impersonate account holders, it should be readily understood that step 806 may be omitted, and the unlock code transmitted to the secure lockbox 120 in step 807 may operate as an instruction for the secure lockbox 120 to enable access by the user 101 to the contents of the compartment 50. In addition, although the steps of the method 800 may be performed by, for example, the server 300, the verification steps 804 and/or 805 may alternatively he performed by a processor within or associated with the secure lockbox 120, such as the processor 22.

Figure 9:
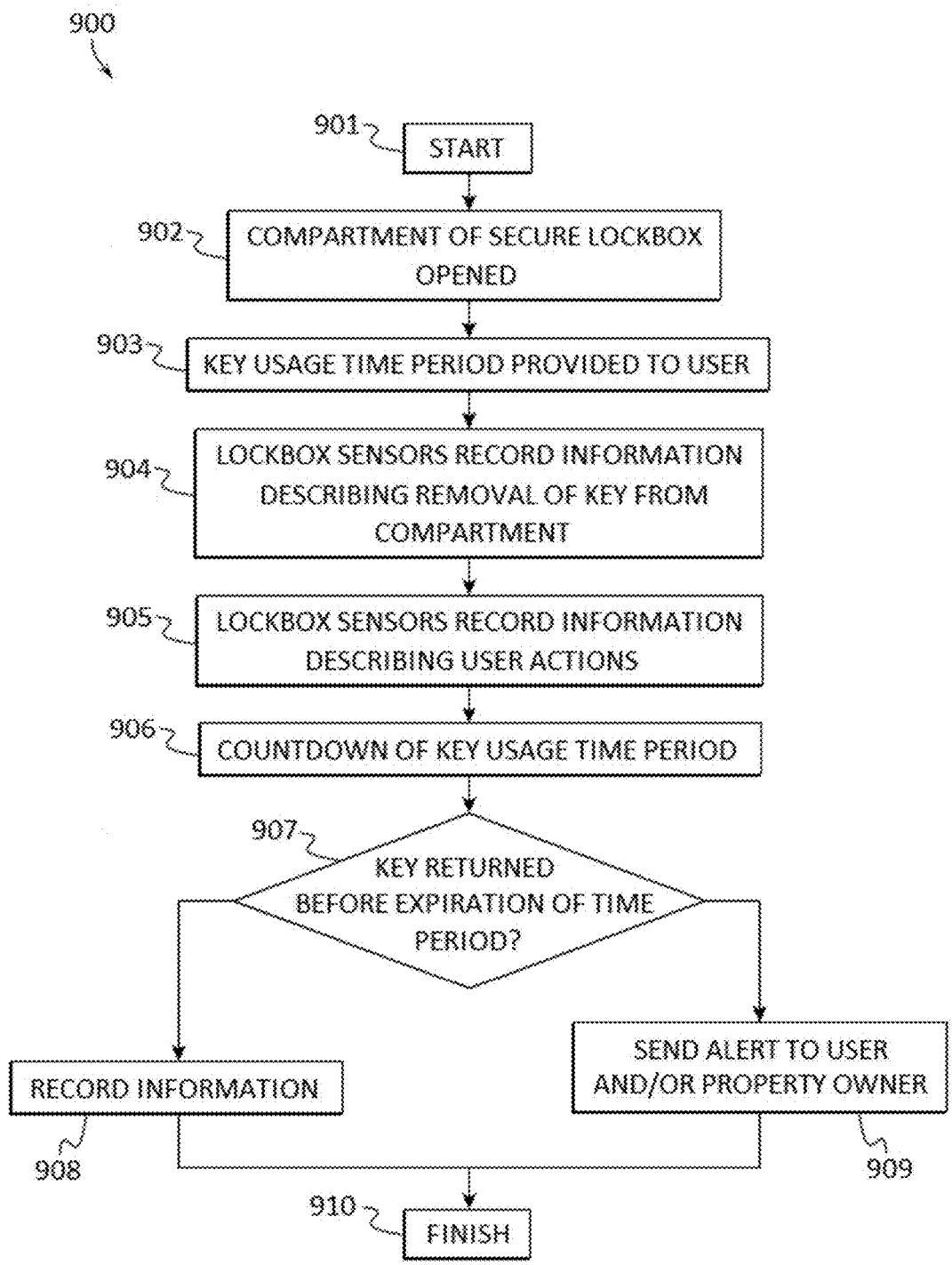
FIG. 9 shows a block diagram of an example of a computer-implemented method of property showing using a secure lockbox according to various embodiments described herein.

FIG. 9 shows a block diagram of an example of a computer-implemented method of property showing using a secure lockbox ("the method") 900 according to various embodiments described herein. In some embodiments, the method 900 may be used to show or otherwise allow access to a real estate property or real estate improvement that the user 101 desires to evaluate at which a secure lockbox 120 (FIGS. 1, 4) is stationed a secure lockbox 120 using a key stored in the compartment 50 of the secure lockbox 120. One or more steps of the method 900 may be performed by a communication application 121, a verification application 122, and/or a sensor application 123 which may be executed by a computing device processor, such as a processor 22 (FIGS. 3, 4 and 5), a processor 302 (FIG. 2), and/or a processor 402 (FIG. 3).

In some embodiments, the method 900 may start 901 and the compartment 50 of a secure lockbox 120 may be opened allowing the user 101 to access the key stored in the secure lockbox 120 in step 902. In further embodiments, the compartment 50 of the secure lockbox 120 may be opened according to steps of method 800 (FIG. 8).

In step 903, a key usage time period may be provided to the user 101. The key usage time period may comprise a length of time that the user 101 may use the key before it is to be returned to the compartment 50 of the secure lockbox 120. In some embodiments, the communication application 121 and/or sensor application 123 may provide the key usage time period to the user 101 through a display module 36 or speaker 41 of a secure lockbox 120. In other embodiments, the communication application 121 and/or sensor application 123 may provide the key usage time period to the user 101 through a display screen or speaker of the client device 400 of the user 101.

Next in step 904, one or more lockbox sensors 32 may record information describing removal of key from the compartment 50, such as if the key is removed and/or the time the key was removed. The sensor application 123 may record the information and/or provide the information to the communication application 121. In some embodiments, a sensor 32 may detect the presence or absence of the key from the compartment 50. In other embodiments, the sensor 32 may, for example, comprise a radio-frequency identification (RFID) sensor which may interact with a RFID tag on the key to provide information describing removal of key from the compartment 50. In alternative embodiments, information describing removal of key from the compartment 50 may be provided by a radio 23 using Wifi, Bluetooth, or NFC communication protocols which may allow the secure lockbox 120 to track removal of the key.

In step 905, one or more lockbox sensors 32 may record information describing actions of the user 101. The sensor application 123 may record the information and/or provide the information to the communication application 121. In some embodiments, a sensor 32 may comprise a door lock sensor which may be configured to provide information to the secure lockbox 120 describing if a door is locked or unlocked and/or open or closed. In further embodiments, a sensor 32 may comprise a sensor configured to provide information to the secure lockbox 120 describing if a magnetic card has been inserted or is present in a magnetic stripe reader 37. In further embodiments, a sensor 32 may comprise a sensor configured to provide information to the secure lockbox 120 describing if a NFC tag, card, key fob, or the like is in proximity to the secure lockbox 120.

Once the key is removed from the compartment 50, the sensor application 123 and/or communication application 121 may begin a countdown of the key usage time period in step 906. For example, if the key usage time period is 30 minutes, the sensor application 123 and/or communication application may begin a 30 minute countdown starting when the key is removed from the compartment 50.

The method 900 may continue to decision block 907. If the key is returned to the compartment 50 of the secure lockbox 120 before the expiration of the key usage time period, the method 900 may continue to step 908 and the sensor application 123 may record information describing the return of the key, such as date and time or return and sensor information, and provide the information to the communication application 121. The communication application 121 may store this information in the property showing database 107 which may be accessed by a user 101 such as the owner or manager of the property. Optionally the communication application may store this information in the data store 24 of the secure lockbox 120 and/or in the property showing database 107. If the key is not returned to the compartment 50 of the secure lockbox 120 before the expiration of the key usage time period, the method 900 may continue to step 909 and the sensor application 123 may provide this information to the communication application 121 which in turn may provide an alert to the user 101 and/or the owner or manager of the property. The communication application 121 may store this information in the property showing database 107 which may be accessed by a user 101 such as the owner or manager of the property. Optionally the communication application may store this alert information in the data store 24 of the secure lockbox 120 and/or in the property showing database 107. After steps 908 or 909 are completed, the method 900 may finish 910.

Figure 10:
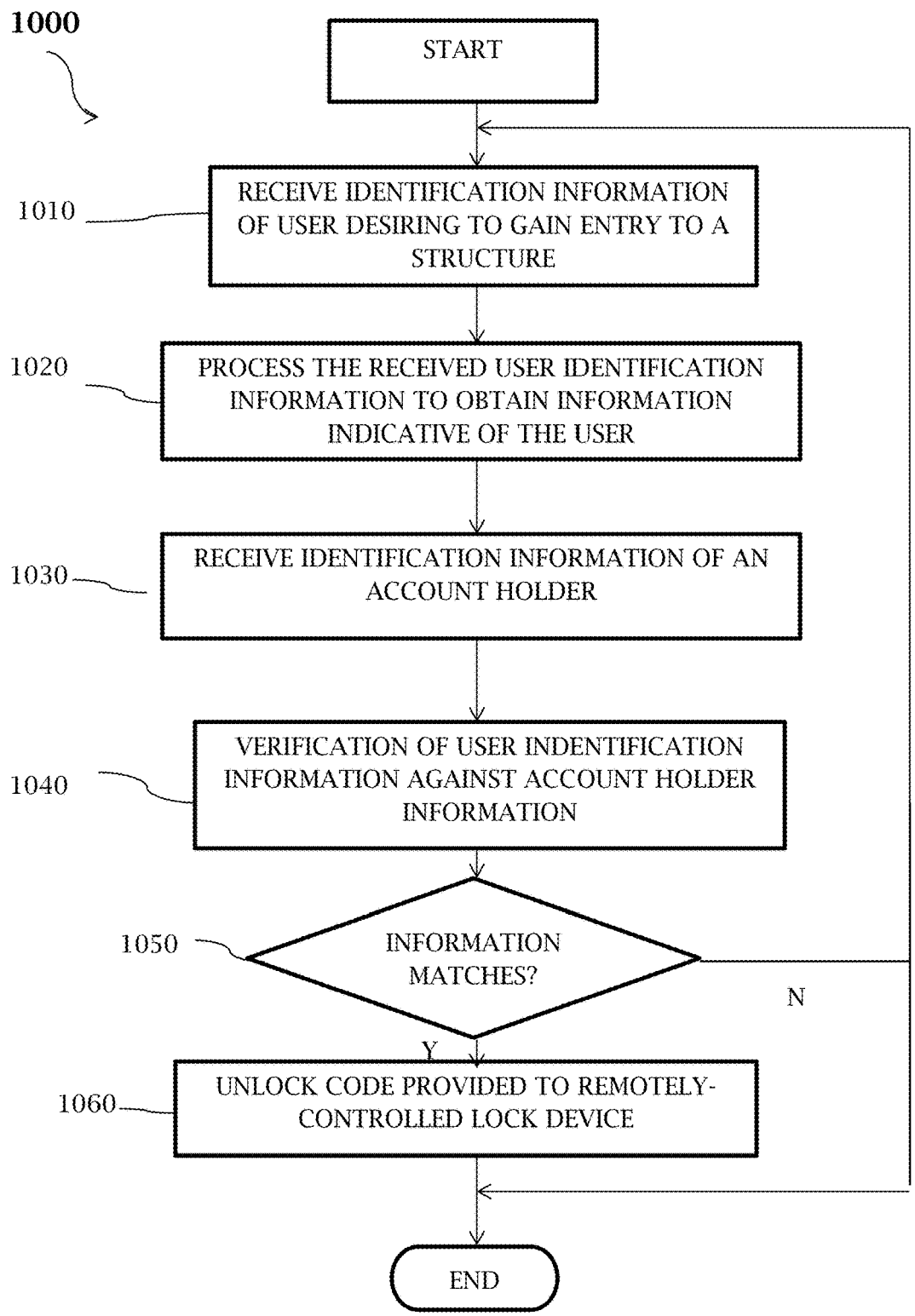
FIG. 10 illustrates a block diagram of an example of a computer-implemented method for controlling access to a structure having an access door with a remotely-controllable electronic lock device according to other embodiments described herein.

Principles of various embodiments of the computer-implements method for gaining access to a secure lockbox in FIG. 8 via a moveable element or door, may additionally be applied for gaining access to a structure having a door employing a remotely operated door lock device, such as the remotely-controllable door lock device 140 of the access door 135 in the structure 130 of FIG. 1. FIG. 10 illustrates a block diagram of an exemplary computer-implemented method 1000 for controlling access to structures using a remotely-controllable door lock device according to various embodiments described herein. For example, the method 1000 may be utilized to allow a user 101 to gain access to a real estate property that the user 101 desires to evaluate. One or more steps of the method 1000 may be performed by a communication application, a verification application, and/or a sensor application, substantially similar to the communication application 121, a verification application 122, and/or a sensor application 123 described above with regard to FIGS. 3, 4 and 5. The steps of the method 1000 may he performed, in whole or in part, by the server 300 or lock control system, individually or in combination.

Referring to FIG. 10, in some embodiments, the method 1000 may be based on the server 300 maintaining accounts for one or more account holders. The accounts may be stored in a property showing database 107 by a communication application 121 and may comprise information on or describing one or more users or account holders 101. For example, account holder information may include user/account holder 101 information such as address or contact information, a photograph or picture of the user/account holder 101, fingerprint or other biotelemetry information, financial and financial account information, information on one or more real estate properties or improvements to real estate properties that the user 101 owns, rents, is selling, is showing, or is otherwise associated with, licensing or other government regulation compliance information, and/or any other information which may describe a user/account holder 101 or be pertinent to the showing of a real estate property or improvement.

In step 1010, identification information of the user 101 attempting to gain access to the structure 130 may be received from the sensor 150 associated with the remotely-controllable door lock device 140 (FIG. 1) by a sensor application or communication application such as, for example, the sensor application 123 and/or communication application 121. In some embodiments, a user 101 may provide identification information to remotely-controllable door lock device 140 by allowing the sensor 150 to sense a characteristic of the user 101 including, for example, if a camera was disposed as the sensor 150 to capture an image of the face of the user 101, or if a fingerprint sensor was disposed as the sensor 150 to obtain fingerprint information of the user 101

In step 1020, the identification information of the user 101 is processed to obtain information of that will be compared against information of an account holder. Then, in step 1030, identification information may be retrieved of an account holder based on, for example, either the identification information of the user 101 received from the sensor 150 in step 1010 or the processed information in step 1020, or some other information identifying which account holder the user 101 purports to be, or from which group of account holders the user 101 purports to belong.

In other embodiments, a user 101 may provide identification information to the remotely-controllable electronic lock device 140 by providing input through a control input, such as a keypad, or providing a bar code or QR code, or other identification code when the sensor 150 comprises a corresponding code reader. In still other embodiments, a user 101 may provide identification information to the remotely-controllable door lock device 140 by swiping a card, badge, credit card, identification card, or the like, having a magnetic information stripe through a magnetic stripe reader. In still further embodiments, a user 101 may provide identification information to the remotely-controllable door lock device 140 by providing wiredly communicated data through a female plug member and/or wirelessly communicated through a radio, such as with Wifi, Bluetooth, NFC, and cellular communication protocols using their client device 400, NFC keyfob, NFC tag, or the like.

Next in step 1040, the processed identification information of the user 101 may be verified against the account holder information of the user 101 by, for example, the verification application 122. In some embodiments, the verification application 122 may compare the image of the user's face from the sensor to image information of the account bolder stored in the property showing database 107 using facial recognition software or technology. In other embodiments, such verification application may compare fingerprint information or the identification information provided through a control input 35, such as a keypad, to identification information of the account holder stored in the property showing database 107.

In still other embodiments, such verification application may compare the identification information provided through a magnetic stripe reader to identification information of the account holder stored in the property showing database 107. In still further embodiments, the verification application 122 may compare the identification information wiredly-communicated data through a female plug member and/or wirelessly communicated through a radio, such as with Wifi, Bluetooth, NFC, and cellular communication protocols using their client device 400, NFC keyfob, NFC tag, or the like, to identification information of the account holder stored in the property showing database 107.

Next, the method 1000 may proceed to decision block 1050. If the processed identification information of the user 101 does not match the information of the account holder, the method 1000 may optionally continue to step 1010 or end. If the verification application matches or verifies the processed identification information of the user 101 to the received information of the account holder, the method 1000 may proceed to step 1060 and an unlock code may be sent to the remotely-controllable door lock device 140 by a communication application such as the communication application 121.

In addition, a corresponding unlock code may also be provided to a user device 400 of the account holder through the data network 105, or by displaying or otherwise outputting the unlock code on through the client device 400 of the account holder to add a level of security. In such an embodiment, if the user 101 receives the unlock code sent to the user device 400 of the account holder, then she/he may enter the unlock code into the remotely-controllable door lock device 140, such as through a control input 35, such as a keypad, female plug member or microphone to provide a higher level of security that the user 101 is the account holder. In other embodiments, the unlock code may be provided to the remotely-controllable door lock device 140 by communicating the code from the client device 400 of the user 101 to the secure lockbox 120 by way of a sensor 32 or Wifi, Bluetooth, NFC, or other wireless communication from the client device 400 to the remotely-controllable door lock device 140. In yet further embodiments, the unlock codes provided to the user 101 and remotely-controllable door lock device 140 may be identical or different. If different unlock codes are employed, such unlock codes must correlate to one another, and such correlation should be known to the remotely-controllable door lock device 140.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices, Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can he implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system May also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry maybe used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, dash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or Wifi network). A modern local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud, e.g., remote server, through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer-implemented method for managing access to contents of a secure lockbox comprising the steps of:
   receiving information representing identification of a user sensed by a sensor associated with a lockbox system;
   processing the sensed information to obtain information indicative of the user;
   receiving information of an account holder, said account holder information including identification information indicative of the account holder;
   verifying the processed information relative to the received account holder information;
   and
   transmitting a first unlock code to the lockbox if the verification step verifies that the processed use information corresponds to the received account holder identification information.

2. The computer-implemented method of claim 1 wherein the sensor is an image sensor and the sensed identification information by the sensor represents image information of the user's face.

3. The computer-implemented method of claim 2 wherein the verifying steps performs a facial recognition process based on the account holder identification information related to the processed image information of the user's face.

4. The computer-implemented method of claim 1 wherein the sensor is code reader and the captured identification information by the sensor represents an identification code.

5. The computer-implemented method of claim 4 wherein the identification code is bar code.

6. The computer-implemented method of claim 1 wherein the verification step and the transmitting step are performed by a processor disposed within the lockbox system.

7. The computer-implemented method of claim 1 further comprising a step of transmitting a second unlock code to a user device associated with the account holder.

8. The computer-implemented method of claim 7 wherein the first unlock code provided to the lockbox corresponds to the second unlock code.

9. A lockbox system comprising:
   a lockbox housing having a compartment formed therein;

a moveable element engaging the lockbox housing to provide or prevent access to the compartment;

an electronically-actuated latching mechanism coupled to the moveable element;

a network interface for providing communication with a communications network;

a sensor for sensing a characteristic related to a user attempting to gain access to the lockbox compartment; and a processor coupled to the latching mechanism, the network interface and the sensor, wherein said processor is adapted to cause the network interface to transmit information indicative of a sensed characteristic related to the user attempting to gain access to the lockbox compartment and capable of processing an unlock signal to control the latching mechanism to provide access to the compartment by the user.

10. The lockbox system of claim 9 wherein said sensor is an image capture device.

11. The lockbox system of claim 9 wherein said sensor is a code reader.

12. The lockbox system of claim 11 wherein said code reader is a bar code reader.

13. The lockbox system of claim 9 wherein said processor is configured to receive the unlock signal from the communication network.

14. The lockbox system of claim 9 wherein said processor is configured to receive information from the network interface related to an account holder and generate the unlock signal based on at least a comparison of the received information relative to information indicative of the sensed characteristic related to the user attempting to gain access to the lockbox compartment.

15. The lockbox system of claim 9 wherein the moveable element is a mountable backplate.

16. The lockbox system of claim 9 wherein the electronically-actuated latching mechanism is a locking mechanism.

17. The lockbox system of claim 9 wherein the electronically-actuated latching mechanism comprises a motor for moving the movable element relative to the housing.

18. The lockbox system of claim 9 further comprising a compartment sensor coupled to the processor wherein the compartment sensor detects the presence or absence of contents within the compartment.

19. The lockbox system of claim 9 wherein said processor is disposed separate from the housing.

20. A computer implemented method for providing access to a structure comprising the steps of:

receiving information representing identification information of a user attempting to gain access to the structure sensed by a sensor associated with a remotely-controllable electronic lock device;

processing the captured information to obtain information indicative of the user;

receiving information of an account holder, said information including identification information indicative of the account holder;

verifying the processed user information relative to the account holder identification information; and transmitting an unlock code to a lock control system associated with the remotely-controllable electronic lock device if the verification step verifies that the processed user information corresponds to the received account holder identification information.

21. The computer-implemented method of claim 20 wherein the sensor is an image sensor and the sensed identification information by the sensor represents image information of the user's face.

22. The computer-implemented method of claim 21 wherein the verifying steps performs a facial recognition process based on the account holder identification information relative to processed image information of the user's face.

23. The computer-implemented method of claim 20 wherein the sensor is a code reader and the sensed identification information by the sensor represents an identification code.

24. The computer-implemented method of claim 23 wherein the identification code is bar code.

25. The computer-implemented method of claim 20 wherein the verification step and transmitting step are performed by the lock control system.

26. The method of claim 20 wherein the lock control system is located proximate the structure.

27. The method of claim 20 wherein the step of transmitting the unlock code to a lock control system associated with the remotely-controllable electronic lock device comprises the step of transmitting a signal to a client device associated with the user, wherein the user's client device transmits a signal to a receiver of the remotely-controllable electronic lock device to cause such remotely-controllable electronic lock device to enable access.

* * * * *